(12) United States Patent
Ho

(10) Patent No.: US 7,378,200 B2
(45) Date of Patent: *May 27, 2008

(54) METHOD OF FABRICATING COLOR FILTER SUBSTRATE

(75) Inventor: I-Hua Ho, Taoyuan (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,436

(22) Filed: Sep. 15, 2006

(65) Prior Publication Data

US 2008/0014512 A1    Jan. 17, 2008

(30) Foreign Application Priority Data

Jul. 11, 2006   (TW) ............................... 95125194 A

(51) Int. Cl.
*G02F 1/1335* (2006.01)
*G02B 5/20* (2006.01)

(52) U.S. Cl. ........................................................ 430/7

(58) Field of Classification Search .................. None
See application file for complete search history.

(56) References Cited

U.S. PATENT DOCUMENTS

| 6,855,465 | B2 | 2/2005 | Yi et al. | |
|---|---|---|---|---|
| 2001/0040656 | A1* | 11/2001 | Na et al. | 349/110 |
| 2003/0104291 | A1 | 6/2003 | Yi et al. | |
| 2004/0125322 | A1* | 7/2004 | Sawasaki | 349/156 |
| 2005/0112485 | A1 | 5/2005 | Lee et al. | |
| 2005/0264722 | A1* | 12/2005 | Choi | 349/110 |

FOREIGN PATENT DOCUMENTS

JP   11-212075 A  *  8/1999

* cited by examiner

*Primary Examiner*—John A. McPherson
(74) *Attorney, Agent, or Firm*—J.C. Patents

(57) ABSTRACT

A method of fabricating a color filter substrate is provided. First, several color filter patterns are formed on a substrate. Then, an opaque layer is formed over the substrate and the color filter patterns. After that, the opaque layer is patterned to form a black matrix between the color filter patterns and several protrusions on the color filter patterns simultaneously. Finally, several spacers are formed on a part of the black matrix.

10 Claims, 6 Drawing Sheets

METHOD OF FABRICATING COLOR FILTER SUBSTRATE

CROSS-REFERENCE TO RELATED APPLICATION

This application claims the priority benefit of Taiwan application serial no. 95125194, filed on Jul. 11, 2006. All disclosure of the Taiwan application is incorporated herein by reference.

BACKGROUND OF THE INVENTION

1. Field of the Invention

The present invention relates to a method of fabricating a color filter (CF) substrate, and more particularly, to a method of fabricating a color filter substrate capable of forming a black matrix (BM) and protrusions simultaneously.

2. Description of Related Art

The liquid crystal display (LCD) is one of the most important milestones in the history of displaying techniques. Because the LCD has a light and slim body, consumes very little power and produces very little radiation in operation, it has become one of the mainstream products in the market.

However, the earlier versions of the liquid crystal display suffer from a narrow viewing angle problem. To enhance the viewing angle of the display, the industry has developed a multi-domain vertically aligned (MVA) LCD. The MVA LCD has protrusion structures on the color-filter substrate and/or the active-device-array substrate so that the liquid crystal molecules tilt in multiple directions to enhance the viewing angle of the liquid crystal display.

The process of forming the color-filter substrate of the conventional MVD LCD includes forming a black matrix on a glass substrate. Then, a color filter layer having red, blue and green filter patterns is formed. After that, an overcoat layer and a common electrode are sequentially formed over the foregoing structure. Thereafter, protrusions and photo spacers are separately formed over the common electrode. Finally, an alignment layer is formed over the foregoing structure.

According to the foregoing description, the process of forming the color filter side substrate of the conventional MVD LCD requires at least more than four photo-mask processes. With the current trend of reducing the number of photo-mask processes in the process of forming a liquid crystal display, further simplification of the process is preferred. Therefore, half-tone techniques and back exposure techniques have been developed to reduce the number of photo-masks. However, the half-tone technique is more difficult to implement and the cost of the photo-mask is higher. On the other hand, the back exposure technique has difficulty controlling the width of the black matrix and the level of precision demanded is also high so that there are still plentiful grounds for improvement.

SUMMARY OF THE INVENTION

Accordingly, at least one objective of the present invention is to provide a method of fabricating a color filter substrate capable of forming a black matrix and protrusions simultaneously so that the process of fabricating the color filter substrate is simplified.

To achieve these and other advantages and in accordance with the purpose of the invention, as embodied and broadly described herein, the invention provides a method of fabricating a color filter substrate. First, several color filter patterns are formed on a substrate. Then, an opaque layer is formed over the substrate and the color filter patterns. After that, the opaque layer is patterned to form a black matrix between the color filter patterns and several protrusions on the color filter patterns simultaneously. Finally, several spacers are formed on a part of the black matrix.

In one embodiment of the present invention, after forming the black matrix and the protrusions but before forming the spacers, the method further includes forming an electrode layer to cover the color filter patterns, the black matrix and the protrusions.

In one embodiment of the present invention, the method of fabricating the color filter substrate further includes forming an alignment layer over the electrode layer and the protrusions.

In one embodiment of the present invention, the material constituting the electrode layer includes indium tin oxide (ITO) or indium zinc oxide (IZO).

In one embodiment of the present invention, after forming the color filter patterns but before forming the opaque layer, the method further includes forming an electrode layer to cover the color filter patterns.

In one embodiment of the present invention, the method of fabricating the color filter substrate further includes forming an alignment layer over the electrode layer and the protrusions.

In one embodiment of the present invention, the material constituting the electrode layer includes indium tin oxide or indium zinc oxide.

In one embodiment of the present invention, the foregoing opaque layer includes an organic material layer.

In one embodiment of the present invention, the foregoing opaque layer includes a photosensitive material layer.

In one embodiment of the present invention, the method of patterning the opaque layer to form the black matrix and the protrusions includes disposing a photo-mask having a black matrix pattern and a protrusion pattern therein above the substrate. Then, a photo-exposure to the opaque layer is performed through the photo-mask. Finally, the exposed opaque layer is developed to form the black matrix and the protrusions.

In one embodiment of the present invention, the material constituting the spacers is identical to that of the black matrix and the protrusions.

In one embodiment of the present invention, the material constituting the spacers is different from that of the black matrix and the protrusions.

In one embodiment of the present invention, the foregoing color filter patterns include at least a red filter pattern, at least a blue filter pattern and at least a green filter pattern.

In the present invention, a method of fabricating color filter substrate that forms the black matrix and the protrusion simultaneously is deployed. Therefore, the number of photo-mask processes is reduced, and thus the process of fabricating the color filter substrate is simplified.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
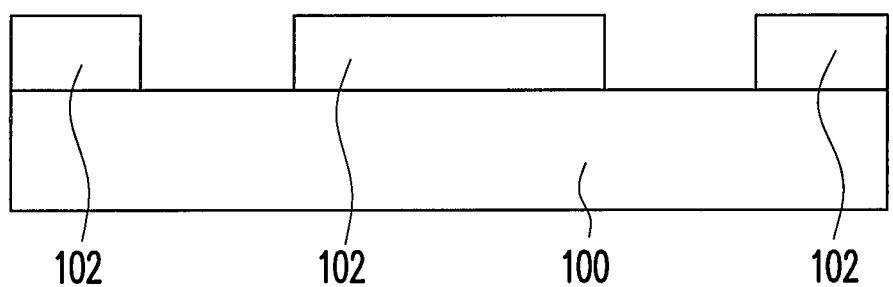
FIGS. 1A through 1F are schematic cross-sectional views showing the process for fabricating a color filter substrate according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

FIGS. 1A through 1F are schematic cross-sectional views showing the process for fabricating a color filter substrate according to one embodiment of the present invention. As shown in FIG. 1A, a substrate 100 is provided. Then, a plurality of color filter patterns 102 are formed on the substrate 100. The substrate 100 is a glass substrate, a quartz substrate, a plastic substrate or other transparent substrate, for example. The color filter patterns 102 are fabricated using a color resin, for example. In the present embodiment, the color filter patterns 102 include at least a red filter pattern, at least a blue filter pattern and at least a green filter pattern.

Figure 1B:
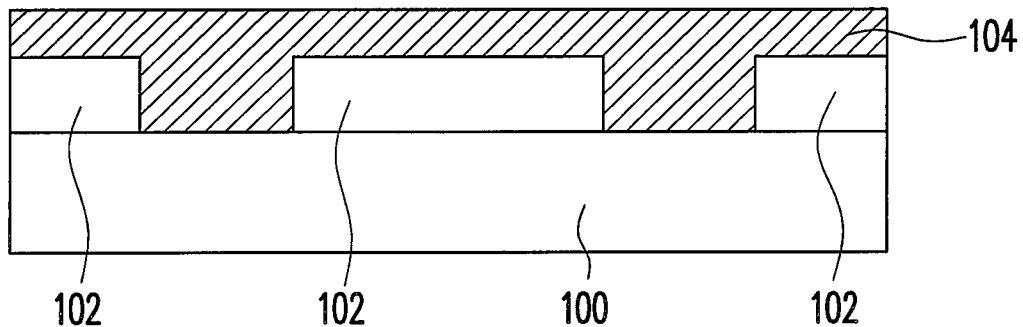

As shown in FIG. 1B, an opaque layer 104 is formed over the substrate 100 and the color filter pattern 102. The method of forming the opaque layer 104 includes spin-coating a layer of liquid opaque material over the substrate to cover the color filter patterns 102. Then, a baking process is performed so that the liquid opaque material is hardened into the opaque layer 104. In one embodiment, the opaque layer 104 includes an organic material layer, for example, a resin material. Preferably, the opaque layer 104 is a photosensitive material layer.

Figure 1C:
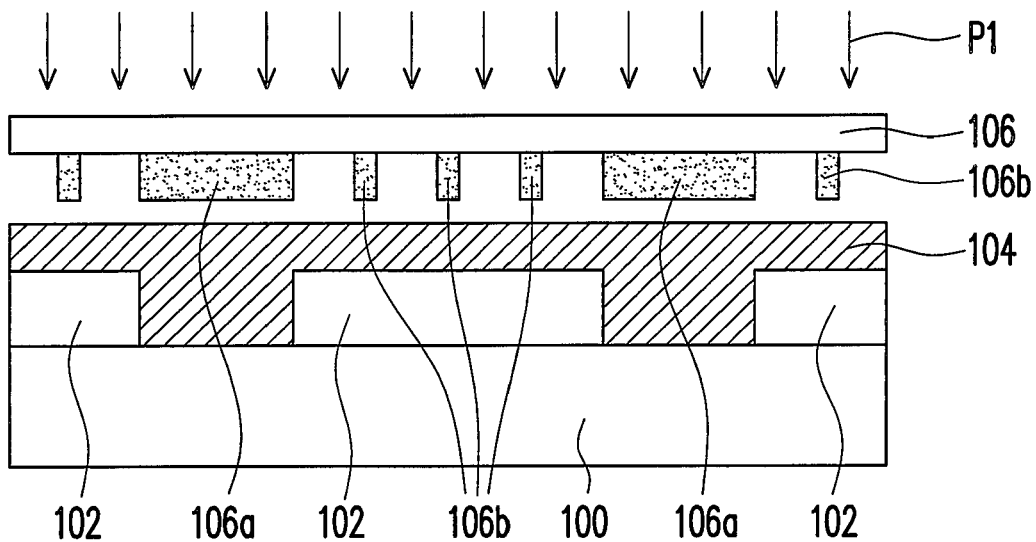
Figure 1D:
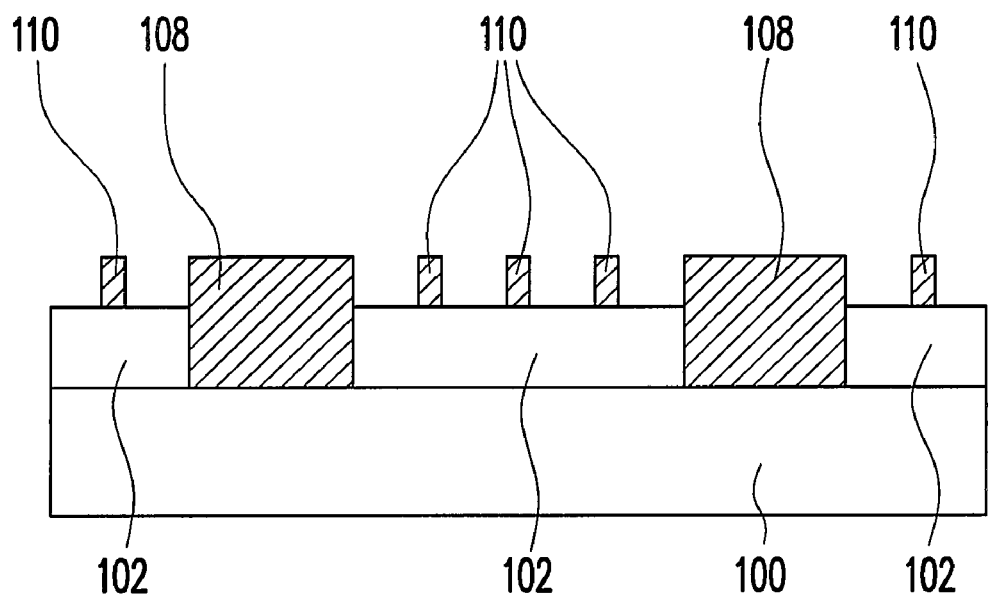

As shown in FIGS. 1C and 1D, a patterning process is performed to pattern the opaque layer 104 so as to form a black matrix 108 between the color filter patterns 102 and a plurality of protrusions 110 on the color filter pattern 102 simultaneously. The patterning process is explained in more detail below. First, as shown in FIG. 1C, a photo-mask 106 is disposed above the substrate 100. The photo-mask 106 has a black matrix pattern 106a and a protrusion pattern 106b therein. Then, a photo-exposure process P1 is performed to transfer the pattern on the photo-mask 106 to the opaque layer 104. Next, as shown in FIG. 1D, the photo-exposed opaque layer 104 is developed to form the black matrix 108 between the color filter patterns 102 and the protrusions 110 on the color filter patterns 102 simultaneously.

In the foregoing photo-exposure process P1, ultraviolet light is used as the light source and the photo-mask 106 is used as the photo-mask to expose the opaque layer 104, for example. Then, in the development process, the exposed substrate is, for example, immersed in a pool of developing agent or rinsed by a developing agent so that the opaque layer 104 is patterned.

Figure 1E:
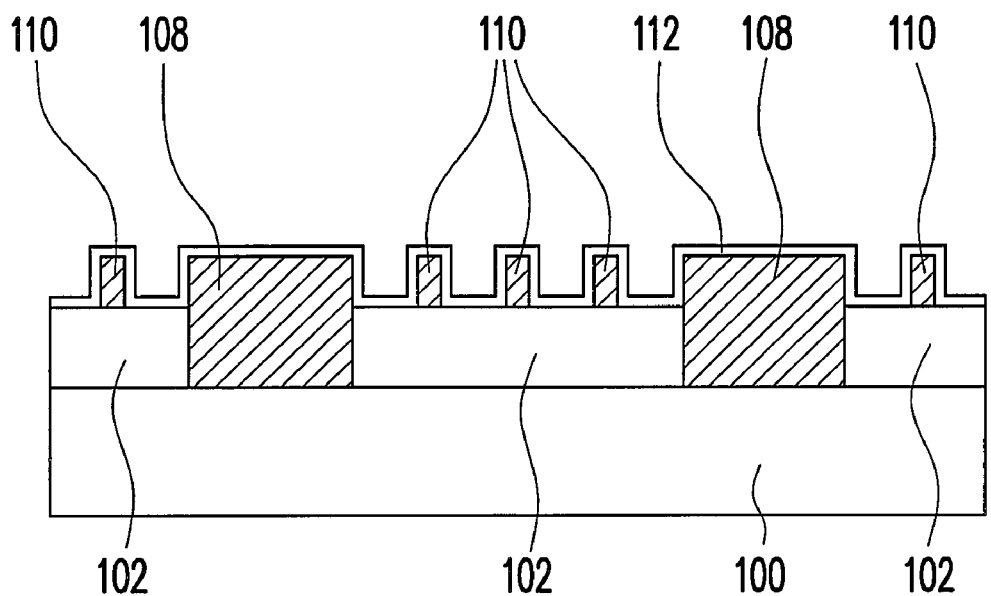

As shown in FIG. 1E, an electrode layer 112 is formed over the substrate to cover the color filter patterns 102, the black matrix 108 and the protrusions 110. In one embodiment, the electrode layer 112 is formed, for example, by performing a deposition process such as sputtering. The material constituting the electrode layer 112 includes indium tin oxide (ITO), indium zinc oxide (IZO) or other transparent electrode material.

Figure 1F:
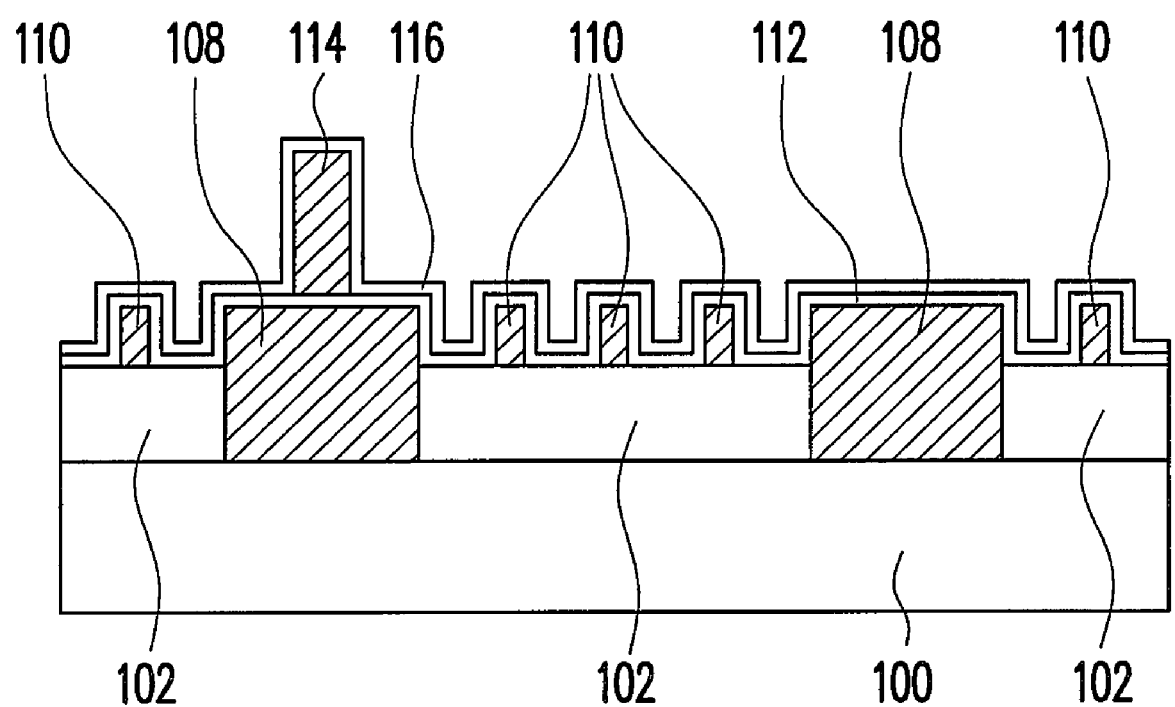

As shown in FIG. 1F, a plurality of spacers 114 are formed on the electrode layer 112 above a part of the black matrix 108. In the present embodiment, the spacers 114 are photoresist spacers, for example. The method of forming the spacers 114 includes spin-coating a liquid photoresist agent over the substrate 100 to cover the electrode layer 112 and then performing a baking process to harden the photoresist agent. After that, the photoresist is exposed and developed to form the photoresist spacers. The material constituting the spacers 114 can be identical to or different from the material constituting the black matrix 108 and the protrusions 10.

In addition, the method of fabricating the color filter substrate in the present embodiment may further includes forming an alignment layer 116 on the electrode layer 112 and the protrusions 110. The alignment layer 116 is fabricated using polyimide (PI), for example. The method of forming the alignment layer 116 includes performing an inkjet printing or a transfer printing to form a polyimide layer over the substrate 100 and then performing a rubbing process, so that the polyimide layer has the required direction of alignment.

Second Embodiment

Figure 2A:
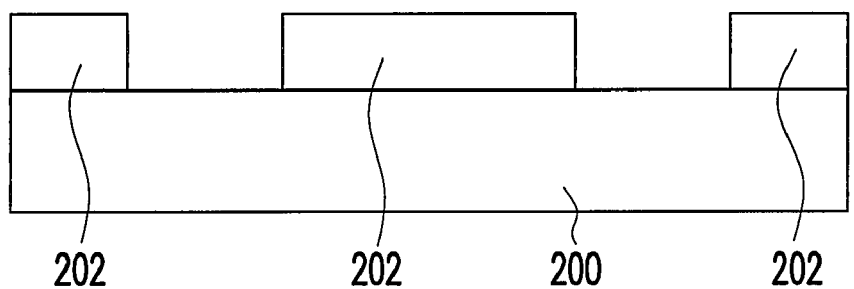
FIGS. 2A through 2F are schematic cross-sectional views showing the process for fabricating a color filter substrate according to another embodiment of the present invention.
Figure 2B:
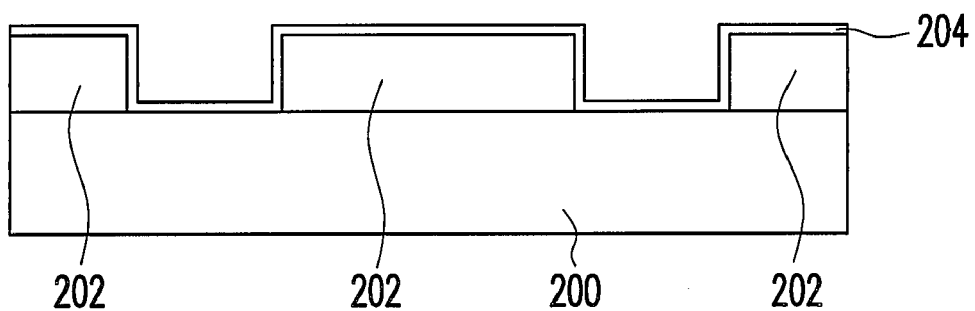

FIGS. 2A through 2F are schematic cross-sectional views showing the process for fabricating a color filter substrate according to another embodiment of the present invention. The fabricating method in the present embodiment is very similar to the first embodiment. The main difference is that, after forming the color filter patterns 202 on the substrate 200, an electrode 204 is formed to cover the color filter patterns 202 as shown in FIG. 2B. Thus, the present embodiment differs from the sequence in the first embodiment of forming the color filter patterns 102 and then forming the opaque layer 104.

Figure 2C:
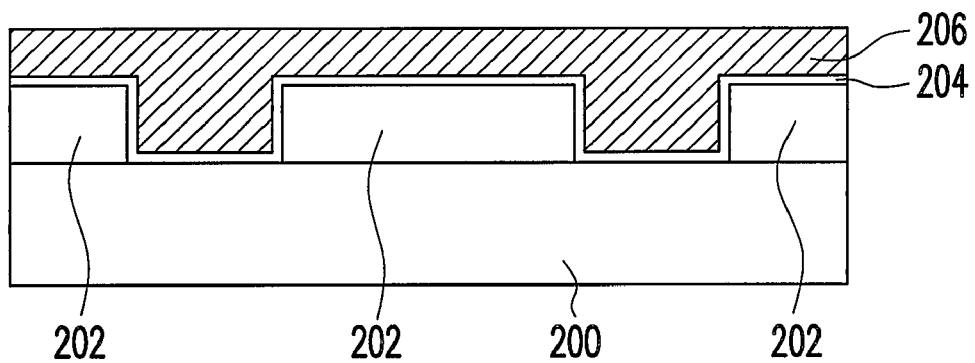
Figure 2D:
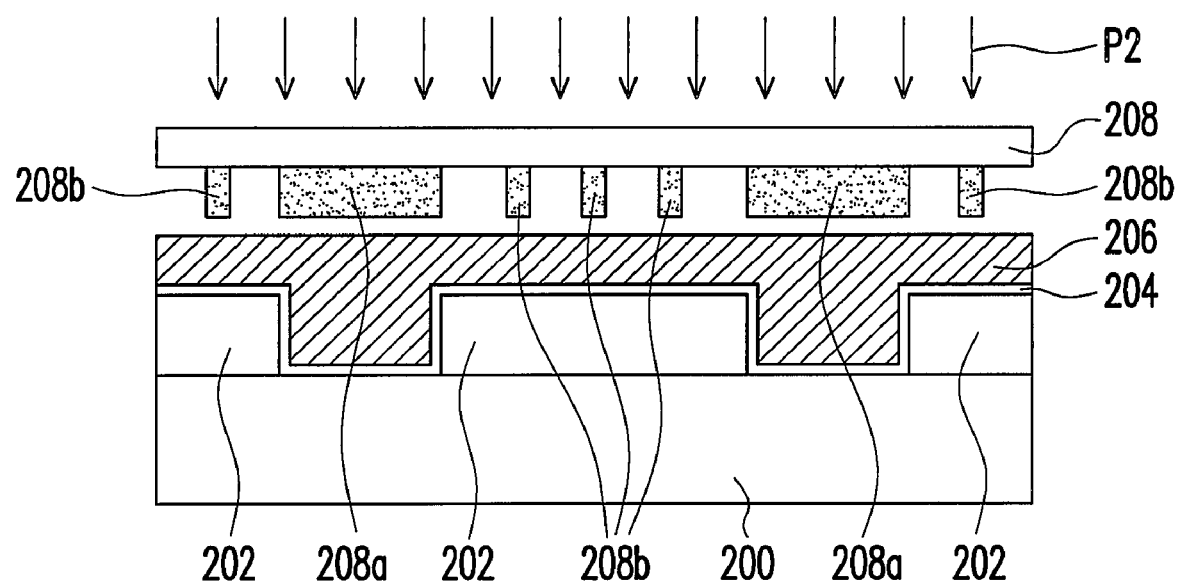
Figure 2E:
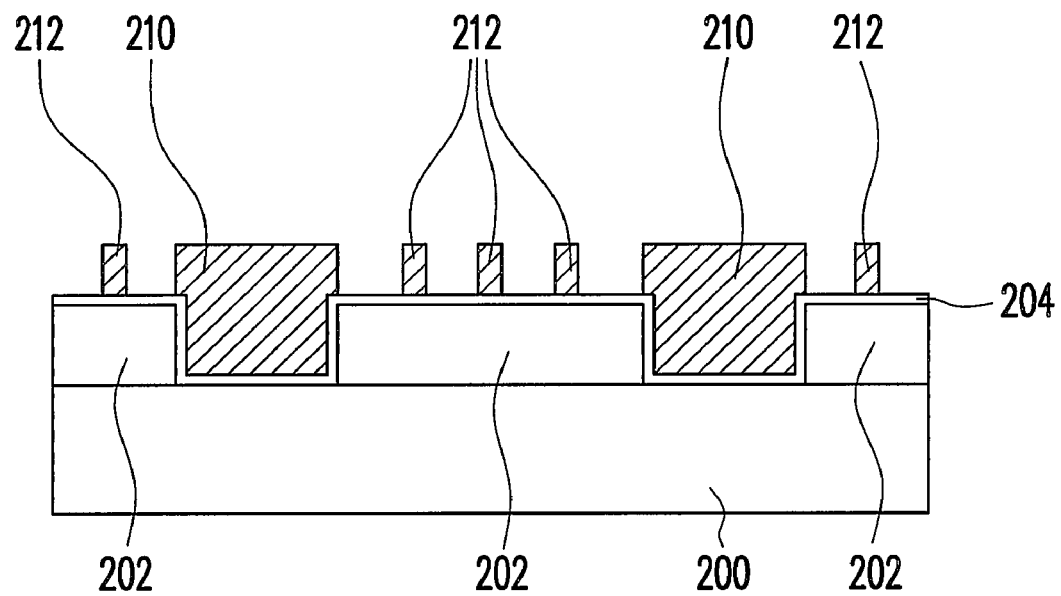
Figure 2F:
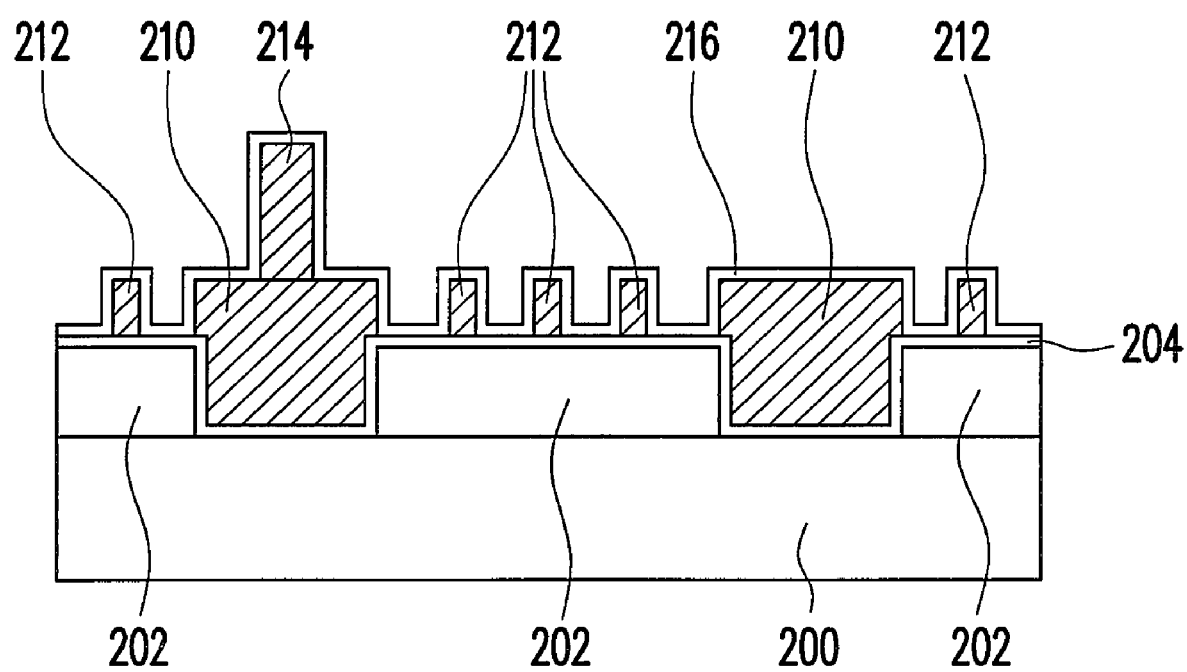

As shown in FIG. 2C, the present embodiment includes forming an opaque layer 206 on the electrode layer 204. Then, as shown in FIG. 2D, a photo-mask 208 having a black matrix pattern 208a and protrusion pattern 208b therein is used to perform a photo-exposure process P2, and then performing a development process. Thus, the opaque layer 206 is patterned to form the black matrix 210 on the electrode layer 204 and the protrusions 212 on the electrode layer 204 above the color filter patterns 202 as shown in FIG. 2E. Thereafter, as shown in FIG. 2F, spacers 214 are formed over the black matrix 210. Similarly, the present embodiment also includes forming an alignment layer 216 over the substrate 200 to cover the electrode layer 204, the black matrix 210, the protrusions 212 and the spacers 214.

Since the second embodiment of the present invention uses the same methods and material layers as in the first embodiment, a detailed description is omitted.

In summary, the method of fabricating the color filter substrate in the present invention includes using a single photo-mask process to form a black matrix and a plurality of protrusions on the substrate simultaneously. Thus, compared with the conventional method of fabricating the color filter substrate, the present invention is able to save at least one photo-mask process. In addition, the present invention does not need to use the more difficult and costly half-tone technique or the back exposure technique. Therefore, the method of fabricating the color filter substrate in the present invention has the advantages of simplifying the process and reducing the cost of producing the display device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a color filter substrate, comprising:
    forming a plurality of color filter patterns on a substrate;
    forming an opaque layer over the substrate and the color filter patterns;
    patterning the opaque layer to form a black matrix between the color filter patterns and a plurality of protrusions on the color filter patterns simultaneously;
    forming an electrode layer to cover the color filter patterns, the black matrix and the protrusions; and
    forming a plurality of spacers on the electrode layer over a part of the black matrix.

2. The method of claim 1, further comprising forming an alignment layer on the electrode layer and the spacers.

3. The method of claim 1, wherein the material constituting the electrode layer comprises indium tin oxide or indium zinc oxide.

4. The method of claim 2, wherein the material constituting the electrode layer comprises indium tin oxide or indium zinc oxide.

5. The method of claim 1, wherein the material constituting the opaque layer comprises organic material.

6. The method of claim 1, wherein the material constituting the opaque layer comprises photosensitive material.

7. The method of claim 1, wherein patterning the opaque layer to form the black matrix and the protrusions comprises:
    disposing a photo-mask above the substrate, wherein the photo-mask has a black matrix pattern and a protrusion pattern thereon;
    performing a photo-exposure process on the opaque layer through the photo-mask; and
    performing a development process to form the black matrix and the protrusions.

8. The method of claim 1, wherein the material constituting the spacers and the material constituting the black matrix and the protrusion are identical.

9. The method of claim 1, wherein the material constituting the spacers and the material constituting the black matrix and the protrusion are different.

10. The method of claim 1, wherein the color filter patterns comprises a red filter pattern, a blue filter pattern, and a green filter pattern.

* * * * *